US006192242B1

United States Patent
Rollender

(10) Patent No.: US 6,192,242 B1
(45) Date of Patent: Feb. 20, 2001

(54) METHOD FOR PORING A MOBILE DIRECTORY NUMBER FROM ONE WIRELESS SERVICE PROVIDER TO ANOTHER

(75) Inventor: Douglas Harold Rollender, Bridgewater, NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/042,602

(22) Filed: Mar. 16, 1998

(51) Int. Cl.$^7$ ........................................................ H04Q 7/20
(52) U.S. Cl. ........................... 455/433; 455/435; 455/445; 455/416
(58) Field of Search ..................................... 455/433, 435, 455/445, 432, 461; 379/211, 88, 219, 207, 230, 220, 221, 229

(56) References Cited

U.S. PATENT DOCUMENTS

| | | | |
|---|---|---|---|
| 5,544,236 | * 8/1996 | Andruska et al. | 379/201 |
| 5,732,131 | * 3/1998 | Nimmagadda et al. | 379/211 |
| 5,839,072 | * 11/1998 | Chien | 455/445 |
| 5,867,562 | * 2/1999 | Scherer | 379/88 |
| 5,878,347 | * 3/1999 | Joensuu et al. | 455/433 |
| 5,890,063 | * 3/1999 | Mills | 455/433 |
| 5,907,807 | * 3/1999 | Chavez, Jr. | 455/436 |
| 5,913,165 | * 6/1999 | Foti | 455/435 |
| 5,933,489 | * 3/1999 | Semsabaugh et al. | 379/219 |
| 5,937,343 | * 8/1999 | Leung | 455/403 |
| 6,049,714 | * 4/2000 | Patel | 455/433 |
| 6,058,313 | * 5/2000 | Slutsman et al. | 455/445 |
| 6,064,887 | * 5/2000 | Kallioniemi et al. | 455/445 |
| 6,097,801 | * 8/2000 | Williams et al. | 379/207 |
| 6,097,960 | * 8/2000 | Rathnasabapathy et al. | 455/461 |

FOREIGN PATENT DOCUMENTS

99/01975  1/1999  (WO) .

OTHER PUBLICATIONS

PCS Number Portability, Giordana, A; Chan, M., Personal, Indoor and Mobile Radio Communications, Wireless Networks– Catching the Mobile Future., 5th IEEE International Symposium on vol.: 4, pp. 1146–1150, 1994.*

* cited by examiner

Primary Examiner—Nay Maung
Assistant Examiner—Joy Redmon

(57) ABSTRACT

The present invention is a method for porting a mobile directory number of a subscriber from a donor wireless service provider to a recipient wireless service provider with minimum interruption to the subscriber's wireless communication service. In one embodiment, the present invention is accomplished by creating an entry for the wireless terminal in the recipient wireless service provider's home location register and a temporary pointer in the donor wireless service provider's home location register, wherein such temporary pointer will cause the donor wireless communication system to route or forward any call intended for the wireless terminal being ported to the recipient wireless communications system for completion in well-known fashion. When the porting process is complete, the temporary pointer is removed or deactivated in the donor wireless service provider's home location register. Advantageously, coordination of the porting process is controlled by the recipient wireless service provider resulting in minimum interruption to the subscriber's wireless communications service.

20 Claims, 2 Drawing Sheets

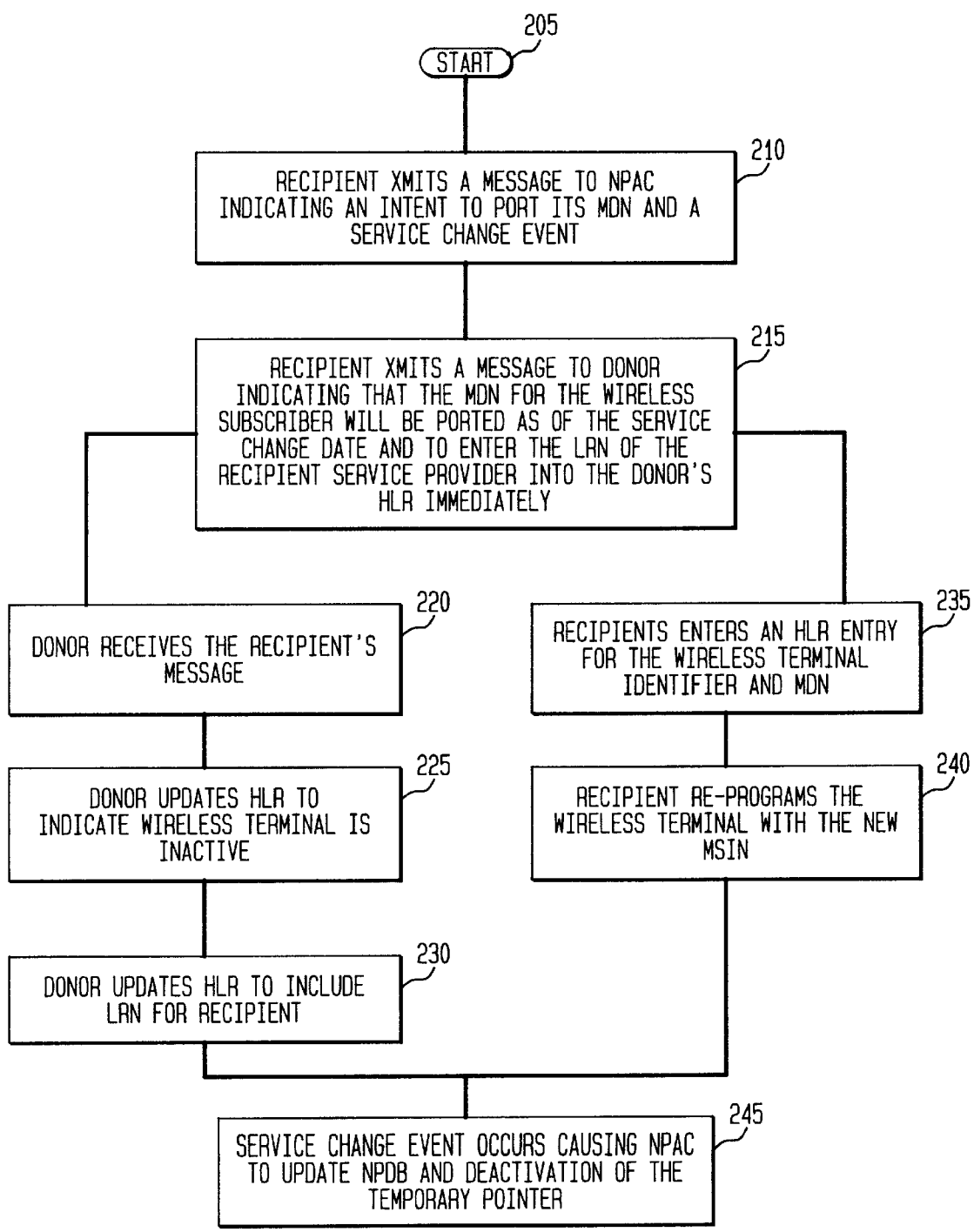

METHOD FOR PORING A MOBILE DIRECTORY NUMBER FROM ONE WIRELESS SERVICE PROVIDER TO ANOTHER

FIELD OF THE INVENTION

The present invention relates to telecommunications in general, and, more particularly, to a method for porting a wireless subscriber's mobile directory number from one wireless service provider to another.

BACKGROUND OF THE INVENTION

When a subscriber first obtains wireless communications service from a wireless service provider, the wireless service provider assigns a mobile station identification number (MSIN) and a mobile directory number (MDN) to the wireless terminal of the subscriber, wherein the MSIN is a number used by the wireless service provider to uniquely identify the subscriber and/or the wireless terminal, and the MDN is the telephone number of the wireless terminal. If the subscriber thereafter desires to switch to a new wireless service provider, the subscriber must surrender the MDN assigned to its wireless terminal by the old wireless service provider, and be assigned a new MDN by the new wireless service provider. Changing MDNs can be extremely inconvenient, especially if the MDN is used for business. Therefore, it would be convenient if a subscriber could take or "port" a MDN from one wireless service provider to another. In other words, it would be advantageous if a subscriber did not have to change the MDN when he or she switches wireless service providers.

Provisions for porting a mobile directory number are expected to be specified in the well-known ANSI Standard 41. Porting a subscriber's MDN requires the occurrence of at least five distinct events which are not required when the subscriber switches wireless service providers without porting the MDN. First, the new or recipient wireless service provider must inform the old or donor wireless service provider and a Number Portability Administrative Center (NPAC) of the intent to port the subscriber's MDN from the donor wireless provider, wherein the NPAC includes a database for associating subscribers' MDNs to location routing numbers (LRN) identified with wireless service providers currently providing wireless communications service to the subscribers.

Second, Number Portability Databases (NPDB) belonging to wireless service providers (including the recipient and donor wireless service providers) must be updated using the NPAC such that the porting subscriber's MDN is associated with the LRN identifying the recipient wireless service provider. Third, a new Mobile Station Identification Number (MSIN) must be assigned to the subscriber's wireless terminal by the recipient wireless service provider, and a record or entry for the subscriber must be created in a Home Location Register (HLR) belonging to the recipient wireless service provider, wherein the HLR comprises information about subscribers of the wireless service provider to which the HLR belongs, including information associating the newly assigned MSIN to the MDN being ported. Thus, the porting subscriber is now recognized by the recipient wireless service provider as one of its subscribers.

Fourth, the subscriber's wireless terminal must be re-programmed with the new MSIN assigned by the recipient wireless service provider such that the wireless terminal will respond to pages to the new MSIN. And lastly, the subscriber's entry in the donor wireless service provider's HLR must be deleted such that the ported subscriber is no longer a subscriber of the donor wireless service provider.

If all five events do not occur simultaneously, the wireless communication service to the subscriber can be interrupted. For example, if the NPDB is updated before the subscriber's record is created in the recipient wireless service provider's HLR, then a call to the subscriber's wireless terminal may not be completed because the recipient wireless service provider would not recognize the wireless terminal as belonging to one of its subscribers. Likewise, if the NPDB is updated before the subscriber's wireless terminal is re-programmed with the new MSIN from the recipient wireless service provider, then a call to the subscriber's wireless terminal may not be completed because the wireless terminal would not recognize the new MSIN as its own and respond to a page to the new MSIN.

Furthermore, the coordination of these five events is complicated by the fact that the disparate elements are owned and operated by different entities. For example, the donor wireless service provider owns and operates its NPDB and HLR, the recipient wireless service provider owns and operates its NPDB and HLR, and the subscriber owns and operates the wireless terminal. Therefore, a need exists for a method that enables a subscriber's mobile directory number to be ported from a donor wireless service provider to a recipient wireless service provider with minimum interruption to the subscriber's wireless communication service.

SUMMARY OF THE INVENTION

The present invention is a method for porting a mobile directory number of a subscriber from a donor wireless service provider to a recipient wireless service provider with minimum interruption to the subscriber's wireless communication service. In one embodiment, the present invention is accomplished by creating an entry for the wireless terminal in the recipient wireless service provider's home location register and a temporary pointer in the donor wireless service provider's home location register, wherein such temporary pointer will cause the donor wireless communication system to route or forward any call intended for the wireless terminal being ported to the recipient wireless communications system for completion in well-known fashion. When the porting process is complete, the temporary pointer is removed or deactivated in the donor wireless service provider's home location register. Advantageously, coordination of the porting process is controlled by the recipient wireless service provider resulting in minimum interruption to the subscriber's wireless communications service.

BRIEF DESCRIPTION OF THE DRAWINGS

The features, aspects, and advantages of the present invention will become better understood with regard to the following description, appended claims, and accompanying drawings where:

FIG. 2 depicts a flowchart of an illustrative embodiment of the present invention.

DETAILED DESCRIPTION

Figure 1:
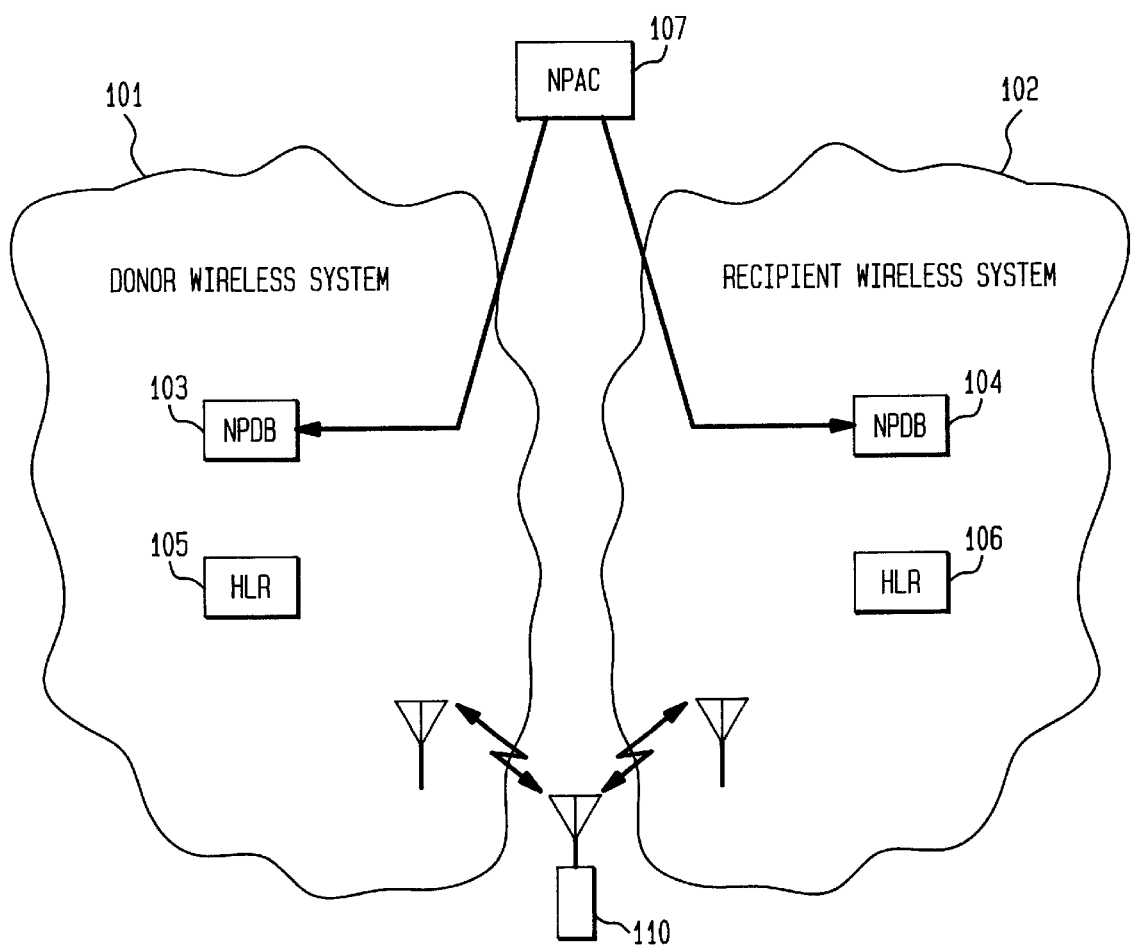
FIG. 1 depicts a schematic diagram of wireless communications systems belonging to two different wireless service providers used in accordance with the present invention.

FIG. 1 depicts a schematic diagram of a Number Portability Administrative Center (NPAC) 107, and a donor wireless communications system 101, and a recipient wireless communications system 102 used in accordance with the present invention. The donor and recipient wireless communications systems 101, 102 belong to a donor and a recipient wireless service provider, respectively. The donor wireless communications system is the home wireless communications system of a wireless terminal 110, i.e., wireless communications systems currently providing wireless communications services to a subscriber associated with the wireless terminal 110, whereas the recipient wireless communications system is the wireless communications system that will replace the donor wireless communications system as the home wireless communications system with respect to the wireless terminal 110. It should be understood that the terms "wireless communications system" and "wireless service provider" (and "subscriber" and "wireless terminal") may be used interchangeably at varying points throughout this application and, thus, should not be construed to limit the present invention in any manner.

Both donor and recipient wireless communications systems 101, 102 comprise the switches, base stations and other equipment necessary to provide wireless communications service to the wireless terminal 110. The geographic region serviced by the donor wireless communications system 101 can be coextensive, overlapping or disjoint with the geographic region serviced by the recipient wireless communications system 102. For ease of discussion, only those wireless communications system elements necessary to an understanding of the illustrative embodiment of the present invention are depicted in FIG. 1.

Each wireless communications system 101, 102 includes a Number Portability Database (NPDB) 103, 104 and a Home Location Register (HLR) 105, 106. Each of the NPDBs 103, 104 includes a database for associating or mapping mobile directory numbers (MDN) to location routing numbers (LRN) identified with home wireless communications systems. Table 1 depicts a portion of a typical Number Portability Database.

TABLE 1

A Portion of a Typical Number Portability Database

| Mobile Directory Number | Location Routing Number |
| --- | --- |
| . . . | . . . |
| 717-234-9393 | 717-555-9393 |
| 717-234-9394 | 717-555-9393 |
| . . . | . . . |

Like the NPDBs 103, 104, the NPAC 107 also includes a database for mapping MDNs to LRNs identified with home wireless communications systems. The difference between the NPAC 107 and the NPDBs 103, 104 is that the database of the former is used to periodically or sporadically update the databases of the latter. Additionally, the NPDBs 103, 104 are generally used by service providers to route a call for a wireless terminal through the PSTN to the appropriate home wireless communications system of the wireless terminal.

Each of the HLRs 105, 106 comprises entries or records for subscribers of the wireless communications system to which the HLR belongs. Each entry includes the following information pertaining to a subscriber of the wireless communications system to which the HLR is a part: a MDN, a mobile station identification number (MSIN) assigned to the subscriber by the wireless communications system, a status, and a LRN, if applicable, as will be described herein. The status and LRN information are new information typically not included in prior art home location registers. The status field can be populated with one of two values: active or inactive. When the status field contains an active value, it indicates that the associated wireless terminal belongs to a subscriber of the wireless communications system to which the HLR is a part. Thus, call processing should proceed normally and the value in the LRN field is irrelevant or ignored. By contrast, when the status field contains an inactive value, it indicates that the associated wireless terminal no longer belongs to a subscriber of the wireless communication system to which the HLR is a part. Such inactive value further indicates that the wireless terminal is in the process of being ported to another wireless communication system as identified by the LRN (i.e., the recipient wireless communications system identified by the LRN is now the home wireless communications system of the associated wireless terminal). Table 2 depicts a portion of a home location register in accordance with the present invention.

TABLE 2

Some of the Fields in a Portion of HLR 106.

| Mobile Directory Number | Mobile Station Identification | Status | Location Routing Number |
| --- | --- | --- | --- |
| . . . | . . . | . . . | . . . |
| 324-859-9494 | 324-859-9494 | Active | |
| 324-859-9499 | 324-859-9499 | Inactive | 293-545-8353 |
| 324-747-5410 | 324-859-9502 | Active | |
| . . . | . . . | . . . | . . . |

In accordance with an illustrative embodiment of the present invention, the donor wireless communication system 101 currently provides wireless communications service to a subscriber's wireless terminal 110 (i.e., donor wireless communications system is the home wireless communications system of the wireless terminal 110). An entry or record exists in the donor HLR 105 for the subscriber. Such entry including a MDN, a MSIN assigned to the wireless terminal 110 by the donor wireless communications system 101, an active status and an empty or irrelevant LRN. The NPAC 107 will have an entry for the wireless terminal 110 associating the wireless terminal's MDN with the LRN of the donor wireless communications system 101.

FIG. 2 depicts a flowchart of the steps performed by the recipient wireless service provider in accordance with the illustrative embodiment, which enables a mobile directory number to be ported from the donor wireless service provider to the recipient wireless service provider with minimal interruption in a subscriber's wireless communications service.

In step 210, the recipient wireless communications system 102 transmits a message to the NPAC 107 indicating the intent of the subscriber of wireless terminal 110 to port its current MDN (assigned by the donor wireless service provider) to the recipient wireless service provider and a service change event (wherein the service change event specifies a date and a time when porting shall be completed, including updating the NPDBs of the recipient, donor and other wireless communications systems). Alternately, the service change event for completing the porting process can be determined by the NPAC 107 (and transmitted to the recipient wireless service provider). Upon receiving such message, the NPAC 107 will store the contents of the message and update its database to associate the LRN of the recipient wireless communications system 102 with the MDN of the subscriber's wireless terminal 110 when the service change event occurs.

In step 215, the recipient wireless communications system 102 transmits a message to the donor wireless communications system 101 indicating that the porting process of the MDN for the wireless terminal 110 to the recipient wireless communications system 102 will be completed upon occurrence of the service change event. Upon receipt of such message, the donor wireless communications system 101 will perform the following actions indicated in steps 220, 225 and 230 (not necessarily in that order).

In steps 220, 225 and 230, the donor wireless communications system 101 receives the message transmitted in step 215 and updates its HLR 105 for the wireless terminal 110. Specifically, the entry in the donor HLR 105 for the wireless terminal 110 will be modified such that the status and LRN fields will contain an inactive value and a LRN identifying the recipient wireless communications system 102, respectively.

At approximately the same time, the recipient wireless service provider creates an entry in its HLR 106 for the subscriber of wireless terminal 110, in step 235, wherein such entry includes a new MSIN assigned to the wireless terminal 110 by the recipient wireless service provider, the MDN, an active status, and an empty or irrelevant LRN. In step 240, the wireless terminal is re-programmed at approximately the same time with the new MSIN.

At this time (i.e., completion of steps 220, 225, 230, 235), a temporary pointer to the recipient wireless service provider in the donor HLR 105 has been created. Such temporary pointer will indicate to the donor wireless communications system 101, during the inchoate porting process, to forward or route any call for the wireless terminal 110 to the recipient wireless communications system 102, thereby permitting such call to be completed by the recipient wireless communications system 102 in well-known fashion.

This point can be illustrated using the following scenario involving a call being made to the wireless terminal 110 via the PSTN. Service providers on the PSTN will use their NPDB to route the call to the wireless terminal 110. If the service change event has not yet occurred, then the PSTN will route the call to the donor wireless communication system 101 (since the database of the service provider's NPDB will still be associating the LRN of the donor wireless communications system 102 with the MDN of the wireless terminal 110). Upon being routed to the donor wireless communications system 101, the donor wireless service provider will check the wireless terminal's MDN against its HLR 105 to determine whether the wireless terminal 110 is one of its subscribers. Upon checking the MDN of wireless terminal 110 against its HLR 105, the wireless service provider will see that the wireless terminal 110 is currently inactive and route or forward the call to the recipient wireless communications system identified by the LRN (in the donor's HLR 105) where call processing may be completed by the recipient wireless communications system 102 in well-known fashion.

If the service change event has occurred, then the service provider's NPDB will have an updated database associating the LRN of the recipient wireless communications system 102 with the MDN of the wireless terminal 110. Thus, the PSTN will know to route the call to the recipient wireless communications system 102 where call processing may be completed by the recipient wireless communications system 102 in well-known fashion.

When the service change event occurs, a number of actions will be performed, as specified in step 245 Specifically, the NPAC 107 will cause the NPDBs of the donor, recipient and other wireless communications systems to be updated such that the MDN of wireless terminal 110 will be associated with the LRN for the recipient wireless communications system 102. Additionally, the donor wireless service provider will cause the temporary pointer to recipient wireless communications system 102 to be deactivated or removed (e.g., the entry for the wireless terminal 110 in the donor's HLR 105 will be erased) signifying the completion of the porting process.

In another embodiment of the present invention, a service change event is not provided by the recipient wireless communications system to either the NPAC 107 or the donor wireless communications system 101. In this embodiment, the NPAC 107 will inform the recipient wireless service provider when it has updated the NPDBs. Upon being informed of such an event, the recipient wireless service provider transmits a message to the donor wireless communications system 101 to remove the entry for wireless terminal 110 from its HLR 105.

It is to be understood that the above-described embodiments are merely illustrative of the invention and that many variations may be devised by those skilled in the art without departing from the scope of the invention. For example, the sequence of steps specified in the above description may be varied to achieve the same objective. It is therefore intended that such variations be included within the scope of the following claims.

I claim:

1. A method for porting a mobile directory number associated with a wireless terminal from a donor wireless service provider to a recipient wireless service provider, said method comprising the steps of:

creating a recipient home location register entry for the wireless terminal associating with the mobile directory number to be ported and a mobile station identification number assigned to the wireless terminal by the recipient wireless service provider;

transmitting a first message indicating to a number portability administrative center an intent to port the mobile directory number to the recipient wireless service provider; and transmitting a second message, from the recipient wireless service provider without going through the number portability administrative center, indicating to the donor wireless service provider to include a location routing number identifying the recipient wireless service provider in a donor home location register entry for the wireless terminal.

2. The method of claim 1, wherein the step of creating the recipient home location register entry includes the step of:

assigning the mobile station identification number to the wireless terminal by the recipient wireless service provider.

3. The method of claim 1, wherein the first message further indicates a service change event specifying when porting of the mobile directory number should occur.

4. The method of claim 3, wherein the second message further indicates the service change event.

5. The method of claim 1 comprising the additional step of:

receiving a service change event specifying when number portability databases will be updated to indicate that the recipient wireless service provider is a home wireless service provider for the wireless terminal.

6. The method of claim 5, wherein the second message further indicates the service change event.

7. The method of claim 1 comprising the additional step of:
   transmitting a third message indicating to the donor wireless service provider to delete the donor home location register entry for the wireless terminal.

8. The method of claim 7, wherein the step of transmitting the third message is executed upon occurrence of a service change event.

9. The method of claim 1, wherein the recipient home location register entry for the wireless terminal also has an indication that the wireless terminal is a subscriber of the recipient wireless service provider.

10. The method of claim 1, wherein the second message further indicates to the donor wireless service provider to include an indication in the donor home location register entry for the wireless terminal that the wireless terminal is a subscriber of the wireless service provider identified by the location routing number.

11. A method for porting a mobile directory number associated with a wireless terminal from a donor wireless service provider to a recipient wireless service provider, said method comprising the steps of:
   receiving a message, from the recipient wireless service provider without going through the number portability administrative center, indicating to the donor wireless service provider to include a location routing number identifying the recipient wireless service provider in a donor home location register entry for the wireless terminal; and
   updating the donor home location register entry for the wireless terminal to include the location routing number identifying the recipient wireless service provider.

12. The method of claim 11 comprising the additional step of:
   updating the donor home location register entry for the wireless terminal to include an indication that the wireless terminal is a subscriber of the wireless service provider identified by the location routing number.

13. The method of claim 11 comprising the additional step of:
   removing the donor home location register entry for the wireless terminal.

14. The method of claim 13, wherein the donor home location register entry for the wireless terminal is removed when a service change event occurs.

15. The method of claim 13, wherein the donor home location register entry for the wireless terminal is removed when a message is received indicating to the donor wireless service provider to remove the donor home location register entry for the wireless terminal.

16. A method for porting a mobile directory number associated with a wireless terminal from a donor wireless service provider to a recipient wireless service provider, said method comprising the steps of:
   creating a recipient home location register entry for the wireless terminal associating with the mobile directory number to be ported and a mobile station identification number assigned to the wireless terminal by the recipient wireless service provider;
   transmitting a first message indicating to a number portability administrative center an intent to port the mobile directory number to the recipient wireless service provider;
   transmitting a second message, from the recipient wireless service provider without going through the number portability administrative center, indicating to the donor wireless service provider to include a location routing number identifying the recipient wireless service provider in a donor home location register entry for the wireless terminal; and
   transmitting a third message indicating to the donor wireless service provider to delete the donor home location register entry for the wireless terminal.

17. The method of claim 16, wherein the step of transmitting the third message is executed upon occurrence of a service change event.

18. A method for porting a mobile directory number associated with a wireless terminal from a donor wireless service provider to a recipient wireless service provider, said method comprising the steps of:
   receiving a message, from the recipient wireless service provider without going through the number portability administrative center, indicating to the donor wireless service provider to include a location routing number identifying the recipient wireless service provider in a donor home location register entry for the wireless terminal;
   updating the donor home location register entry for the wireless terminal to include the location routing number identifying the recipient wireless service provider; and
   removing the donor home location register entry for the wireless terminal.

19. The method of claim 18, wherein the donor home location register entry for the wireless terminal is removed when a service change event occurs.

20. The method of claim 18, wherein the donor home location register entry for the wireless terminal is removed when a message is received indicating to the donor wireless service provider to remove the donor home location register entry for the wireless terminal.

* * * * *